US006675154B2

(12) United States Patent
Jaeger

(10) Patent No.: US 6,675,154 B2
(45) Date of Patent: Jan. 6, 2004

(54) METHOD AND SYSTEM FOR THE QUANTUM MECHANICAL REPRESENTATION AND PROCESSING OF FUZZY INFORMATION

(75) Inventor: Gregg S. Jaeger, Cambridge, MA (US)

(73) Assignee: MagiQ Technologies, Inc., New York, NY (US)

( * ) Notice: Subject to any disclaimer, the term of this patent is extended or adjusted under 35 U.S.C. 154(b) by 382 days.

(21) Appl. No.: 09/792,334

(22) Filed: Feb. 23, 2001

(65) Prior Publication Data

US 2003/0101149 A1 May 29, 2003

(51) Int. Cl.[7] .............................................. G06F 15/18
(52) U.S. Cl. .............................................. 706/9; 706/4
(58) Field of Search ........................................ 706/4, 9

(56) References Cited

PUBLICATIONS

Daniel G. Schwartz, "A Connection Between Fuzzy Quantifiers and the Classical Modalities" IEEE the Industrial Fuzzy Control and Intelligent System Conference, Dec. 1994.*

* cited by examiner

*Primary Examiner*—George B. Davis

(57) ABSTRACT

The present invention provides a method and system for representing fuzzy information, and performing fuzzy logic and control operations on that information, using a quantum system. According to one embodiment fuzzy logic and control operations are performed on a quantum computer. The present invention extends quantum information processing beyond purely Boolean-logical information processing, by providing a quantum mechanical method for representing fuzzy information and realizing fuzzy logic and control.

14 Claims, 13 Drawing Sheets

METHOD AND SYSTEM FOR THE QUANTUM MECHANICAL REPRESENTATION AND PROCESSING OF FUZZY INFORMATION

FIELD OF THE INVENTION

The present invention relates to the areas of quantum mechanics, quantum computation and fuzzy logic. In particular, the present invention provides a method and system for fuzzy representation of information using quantum mechanics, allowing fuzzy logic operations and fuzzy control operations to be performed via quantum mechanics.

BACKGROUND INFORMATION

Fuzzy logic is a way of representing and processing information that generalizes ordinary Boolean logic to include a continuous range of propositional values. Applications of classical-mechanically implemented fuzzy logic have ranged from fuzzy logical models of chemical systems to fuzzy control of very large mechanical devices, such as power stations, and distributed systems, such as subways.

Fuzzy information is distinct from digital, binary information in that it is generally represented using the entire range [0,1] of the real numbers, rather than using a binary set of integers such as the set of its endpoints {0,1}.

Fuzziness is usually associated with uncertainty about the nature or state of an object or event. However, fuzziness is distinct from probabilistic uncertainty, though the two are not dissimilar in some respects; for example, they both represent information using the entire numerical range [0,1]. Probability is generally defined as a measure of the frequency with which a random variable takes values inside a specified region in the relevant parameter space, the region representing a "crisp set." A crisp set is one in which a single event is attributed either of the Boolean values, 0 or 1. For example, in an ideal coin toss, there is a probability associated with the result of the coin landing heads-up. The outcome of a coin toss is either one in which the coin is located in a region of parameter space where the upper side of the coin is "heads," 1 for heads, or not, in which case it must be "tails," 0 for heads. By contrast, with fuzziness the uncertainty of a single event is described by its "degree of membership" in a region of parameter space, this region representing a "fuzzy set."

For example, the characteristic of age lends itself to fuzzy representation. An evaluation of a person in middle age with regard to "oldness" reveals that a middle-age person is to some extent old, and to some extent young. A person is of increasing "oldness" with increasing age. For example, a 40-year-old man might have an "old" value of 0.4 and "young" value of 0.6 while a 60-year old might have an "old" value of 0.6 and a "young" value of 0.4. Thus, in the first example, the 40-year old man has a fuzzy membership degree of 0.4 in the fuzzy set "old" and a fuzzy membership degree of 0.6 in the fuzzy set "young." Similarly, in the second example, the 60-year old man has a fuzzy membership degree of 0.6 in the fuzzy set "old" and a fuzzy membership degree of 0.4 in the fuzzy set "young." In general, a fuzzy set associates with each object or event a value from the entire interval [0,1], instead of only the set {0,1} as in the case of a crisp set. This value is not taken to represent a frequency, as in the case of a probability. Rather, it is a description of the degree to which the object or event is attributed the property in question.

Fuzzy control is the use of fuzzy information to exert control over an object. A fuzzy rule-set or knowledge base, rather than a traditional modeling algorithm, is used to exert fuzzy control. The "knowledge base" is a set of prescribed (or learned) fuzzy rules that first quantifies input data (the "fuzzification" stage), carries out inferences (the fuzzy matching stage), and produces a control output (the "defuzzification" stage), which is used by an actuator to perform a resulting control action. Devices for carrying out fuzzy control are referred to as "fuzzy logic controllers."

In certain contexts, fuzzy control operates more efficiently than standard control because it does not require: i) the exact solution of the mathematical problem arising from a crisp characterization of the system under control, or ii) highly precise sensing of the system's state.

The processing of fuzzy information and control operations are traditionally implemented using a computing device such as a general purpose digital computer. Typically, the computing device is equipped with a central processing unit, memory storage, an input/output mechanism and appropriate software to carry out the fuzzy representation and/or control.

FIG. 1a, which is prior art, illustrates a process effected by a fuzzy control system. As shown in FIG. 1a, 102 input received from control object 105 is fuzzified in block 110. Processing block 120 processes fuzzified information, which is then defuzzified at block 130 to generate control output 140. Control output 140 is then used to control control object 105. Note that fuzzify block 110, process block 120 and defuzzify block 130 are typically combined in a single device such as a general purpose digital computer system.

FIG. 1b, which is prior art, illustrates a block diagram of a fuzzy logic control system. Fuzzy logic controller 150 includes processor 160, crisp control actuator 165 and crisp input sensor 170. Fuzzy logic controller 150 is coupled to control object 105 via crisp control actuator 165 and crisp input sensor 170. Crisp input sensor 170 receives input data from control object 105 and transmits this input data to processor 160, which may be, for example, a general-purpose digital computer. Processor 160 performs fuzzy logic processing using input provided by crisp input sensor 170. In particular, processor 160 performs fuzzification, fuzzy logic processing and defuzzification (i.e., blocks 110, 120 and 130 in FIG. 1a) as a function of input provided by crisp input sensor 170. Output generated by processor 160 is used to control actuator 165, which in turn controls control object 105.

FIG. 1c, which is prior art, illustrates a fuzzy control pair. In fuzzy control operations, membership functions corresponding to fuzzy logic propositions form fuzzy control pairs, i.e. fuzzy logic patches or fuzzy rules, known as the "fuzzy rule set." The first proposition of the fuzzy pair (114a–114d) is applied to an input, while the second of the fuzzy pair (117a–117d) is applied to generate an output, which is then utilized for control of a system.

Known methods and systems for performing fuzzy logic operations and fuzzy control such as those depicted in FIG. 1c rely upon conventional/classical computing devices and present inherent limitations for efficient realization of fuzzy logic and control at defuzzification. In particular, typically classical computing architectures are non-parallel, which limits the speed and efficiency in performing fuzzy logic operations. Although significant research has been directed at parallel computing devices, implementing classical fuzzy logic on them still involves a non-negligible number of traditional logical operations.

In recent years, significant research has been directed toward realization of quantum computing devices, which promise significantly greater computational efficiency than conventional classical mechanical digital devices using serial or parallel architectures. Quantum computing is the use of quantum mechanical systems to represent and process information, suggested by Feynman in 1982. Since then, it has been a subject of increasingly active research. The central technology of quantum computing is the quantum computer, a qualitatively novel information processing device.

Aside from the dramatic potential increases in computational efficiency promised by quantum computing devices, the consideration of quantum effects in computation is also necessitated by Moore's Law. Moore's Law describes the rate of miniaturization of information processing systems, such as microchips and predicts an inevitable reduction of the size of a digital computer's functional elements beyond the microscopic realm into the sub-microscopic, quantum realm. Moore's law strongly suggests that the processing of fuzzy information faces the same inevitability of being carried out at the quantum scale as does purely Boolean information processing.

Conventional approaches for relating quantum mechanics and logic have been built on two and three-valued logics similar to Boolean logic, rather than fuzzy set theory or fuzzy logic (see, for example, Varadarajan, 1985). Likewise, it has recently been suggested that some connection might be made between quantum computing and neural information processing. However, efforts have focused on speculations that the human brain or neural system might be a quantum computer of some sort (for example, as discussed in Penrose's *The Emperor's New Mind*), rather than forging a connection between quantum mechanics and fuzzy logic or fuzzy control.

In addition to general aspects of decreasing scale and optimal computational architecture, classical mechanical implementations of "defuzzification" are functionally inefficient in that they require an extra step beyond the essential requirements of measurement, because the predictions of classical theory are not necessarily statistical. On the other hand, in quantum mechanics, the form of measurement itself is generally that of performing averages (through repetitions of the event detection process rather than numerically calculating averages), because the predictions of the theory describe the behavior of ensembles. Furthermore, quantum mechanics and fuzzy control have a common basic component, averaging. In fuzzy control, defuzzification is done through the finding of weighted averages. Fuzzy control and quantum mechanics are thus a natural fit. In addition, the uniquely quantum mechanical correlations present in quantum systems can be used to realize the inference stage of fuzzy control, implementing parallel fuzzy rule sets more efficiently and naturally.

Despite the wealth of advantages for using quantum mechanics to perform fuzzy logic, there are no known methods for implementing fuzzy control and fuzzy information processing using quantum systems. Thus, there exists a significant need to design systems for fuzzy information representation and fuzzy control implementation in a quantum system.

SUMMARY OF THE INVENTION

The present invention provides a method and system for representing fuzzy information, and performing fuzzy logic and control operations on that information using a quantum system. The representation of fuzzy information using quantum systems and implementation of logic operations and fuzzy control using quantum mechanics provides significant computational and efficiency gains over known methods for performing fuzzy logic and control, which rely on conventional classical computing devices. According to one embodiment, fuzzy logic and control operations are performed using a quantum computer. The present invention extends quantum computing beyond purely Boolean-logical information processing, by providing a quantum mechanical method for representing fuzzy information and realizing fuzzy logic and control.

According to one embodiment, fuzzy set membership functions that define fuzzy propositions are represented via quantum states. This is accomplished using the (projection) probability values associated with these states relative to other states in the same Hilbert space. These values are formed into distributions that serve as fuzzy set membership functions. A very large variety of distributions can be formed from quantum mechanical probability values in this manner, allowing a wide range of fuzzy propositions to be captured utilizing the representation method described herein.

Fuzzy logic operations can then be carried out on this fuzzy information, using quantum mechanical unitary evolutions and measurement processes. This information thus can be used to implement quantum fuzzy logic and to carry out fuzzy control operations quantum mechanically.

The fuzzy information takes the form of distributions of quantum mechanical values (traditionally interpreted as probability values for measurement outcomes) that take the full range [0,1], rather than binary quantum superpositions of states taking Boolean values (that is, "qubits"), as in prior, "crisp" forms of quantum information processing.

The invention is a design principle for the representation and processing of fuzzy information in quantum systems for purposes such as logical processing and system control. The principle utilizes quantum probability values to form fuzzy membership functions and specifies quantum mechanical fuzzy logic and fuzzy control operations that use fuzzy set membership functions.

DETAILED DESCRIPTION

Figure 1A:
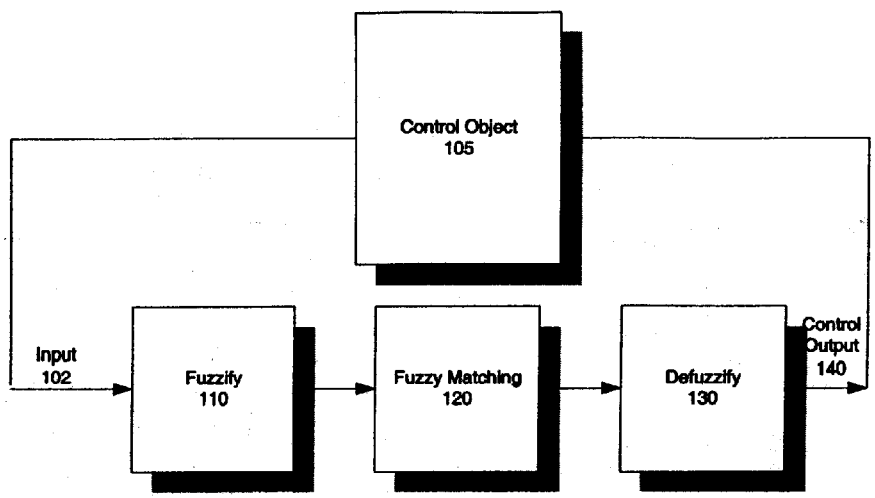
FIG. 1a, which is prior art, illustrates a process effected by a fuzzy control system.
Figure 1B:
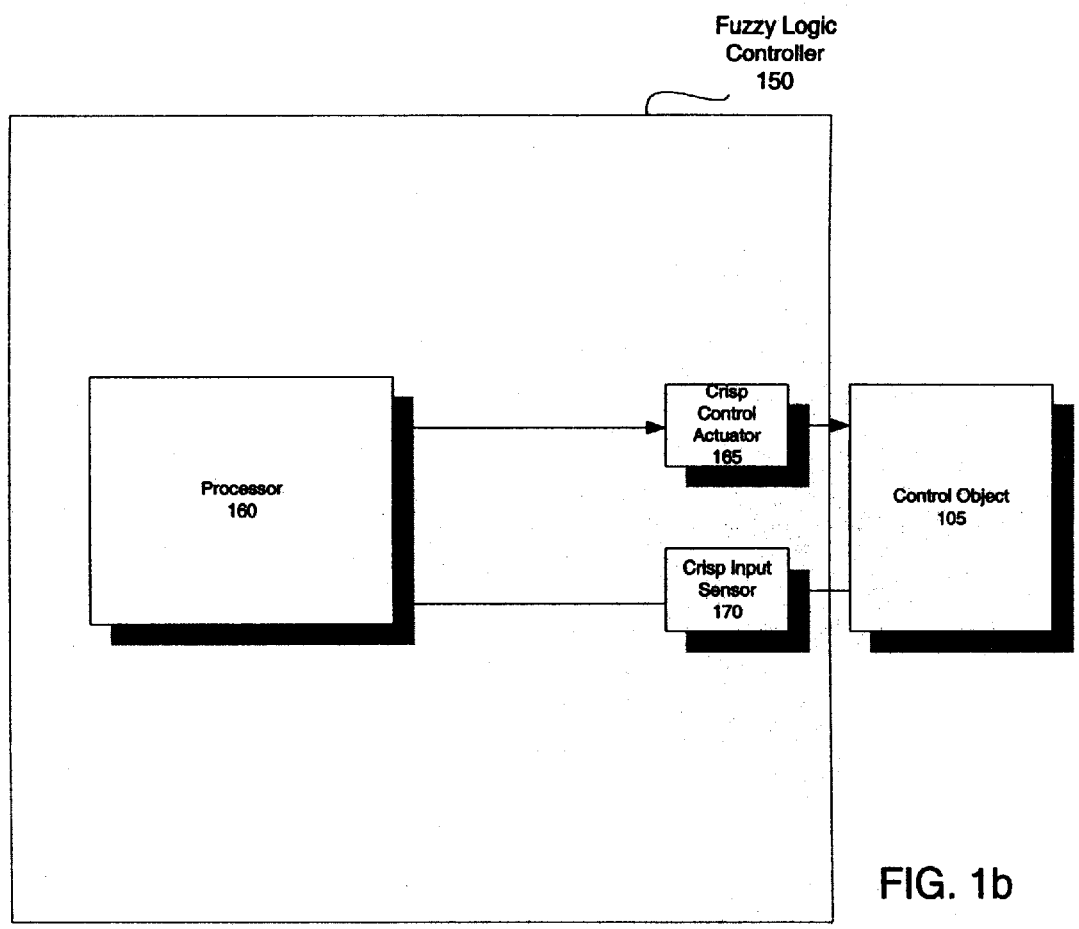
FIG. 1b, which is prior art, illustrates a block diagram of a fuzzy logic control system.
Figure 1C:
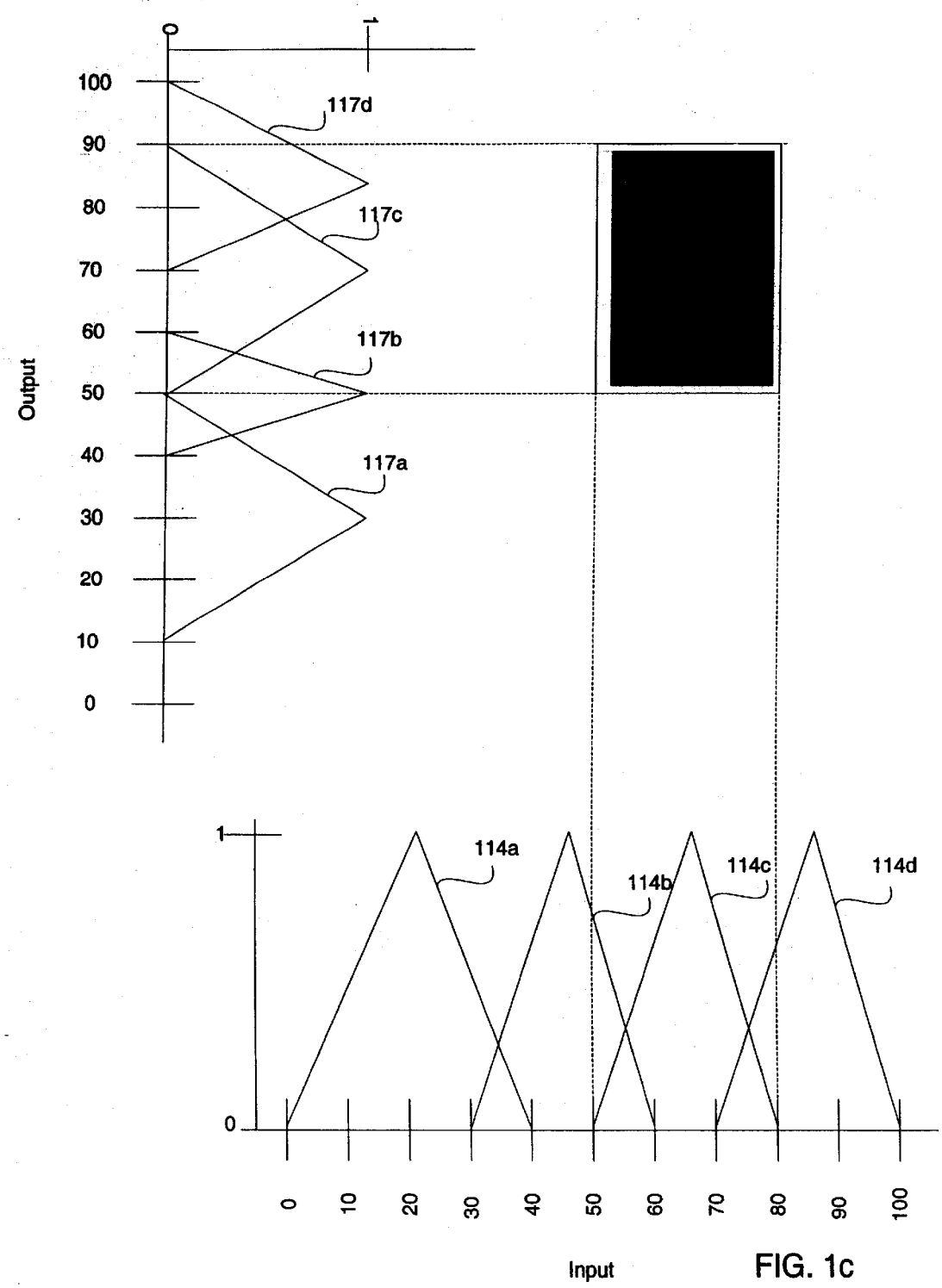
FIG. 1c, which is prior art, illustrates a fuzzy control pair amongst a set of four such pairs.
Figure 2:
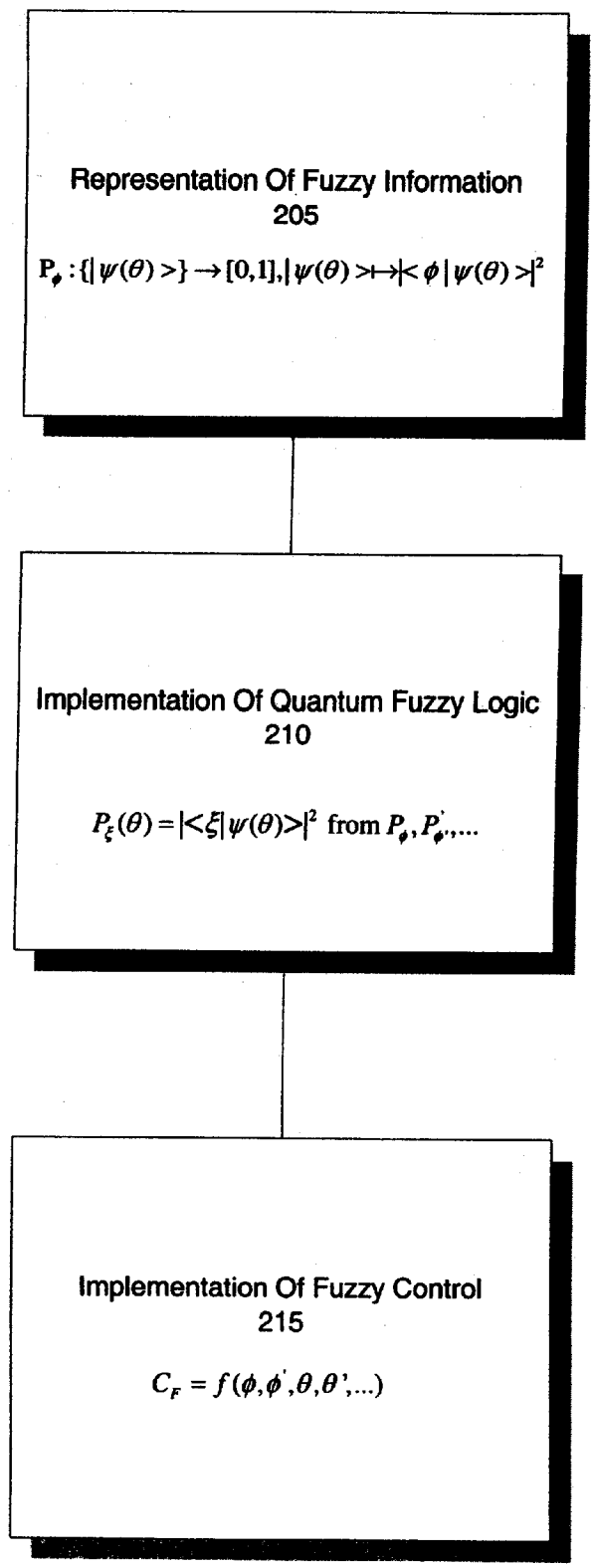
FIG. 2 is a block diagram that depicts a schema for fuzzy information processing and control according to one embodiment of the present invention.

The present invention provides a method and system for quantum fuzzy information processing such that fuzzy information can be represented and processed by quantum systems. FIG. 2 is a block diagram that depicts a schema for fuzzy information processing and control according to one embodiment of the present invention. In particular, FIG. 2 includes blocks 205, 210 and 215, which respectively correspond to functionality for representation of fuzzy information (205), implementation of quantum fuzzy logic (210) and implementation of fuzzy control (210). The detailed functionality of blocks 205, 210 and 215 is briefly described below and in more detail with respect to FIGS. 3, 6, and 8.

In block 205, fuzzy information is represented. According to one embodiment, via block 205 fuzzy set membership functions that define fuzzy propositions are first represented via quantum states. This is accomplished using the (projection) probability values associated with these states relative to other states in the same Hilbert space. These values are formed into distributions that serve as fuzzy set membership functions. In particular, referring to 205 a quantum state $|\phi\rangle$ is chosen to define a distribution, relative to a set of states, $\{|\psi(\theta)\rangle\}$ in the same Hilbert space over a space parameterized by at least one parameter, $\theta$.

In block 210, fuzzy logic is implemented. According to one embodiment of the present invention, fuzzy logic is implemented by forming a new distribution $P_\xi:\{|\psi(\theta)\rangle\} \to [0,1], |\psi(\theta)\rangle \mapsto |\langle\xi|\psi(\theta)\rangle|^2$ in accordance with the particular form of fuzzy logic chosen. Fuzzy logic operations are carried out on information represented via block 205 using quantum mechanical evolution and measurement processes.

In block 215, fuzzy control is performed using a crisp output $C_F$ arising from a measurement of the system in which quantum information has been represented.

Representation of Fuzzy Information in a Quantum System

Figure 3:
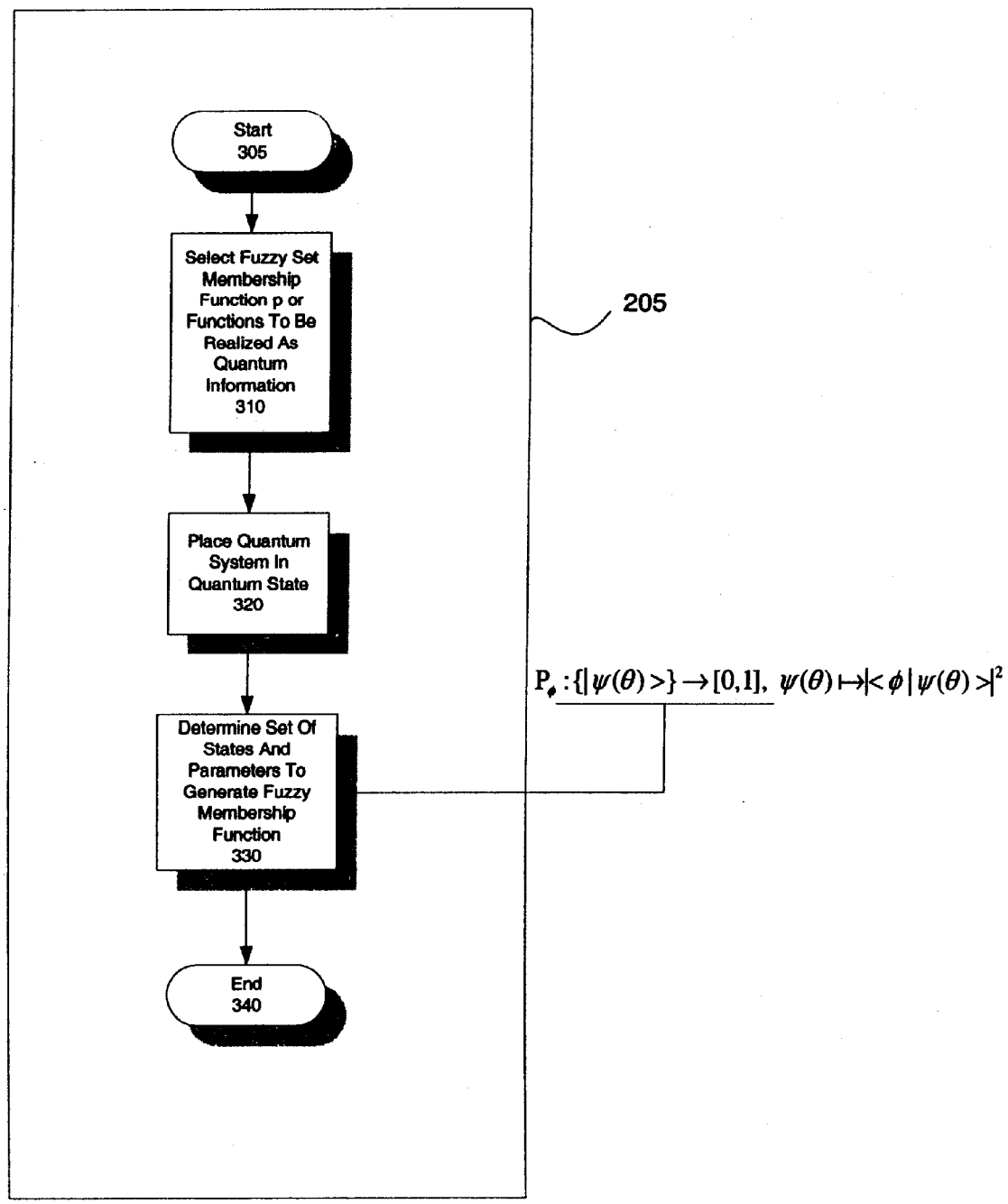
FIG. 3 is a flowchart that depicts a method for representing fuzzy information in a quantum system according to one embodiment of the present invention.

FIG. 3 is a flowchart that depicts a method for representing fuzzy information in a quantum system according to one embodiment of the present invention. The flowchart depicted in FIG. 3 corresponds to block 205 shown in FIG. 2 relating to the representation of fuzzy information. As shown in FIG. 3, in step 310 a fuzzy set membership function P or functions to be realized as quantum information are selected. In step 320, a quantum system is placed in a well-defined quantum state $|\phi\rangle$. In step 330, a set of states $\{|\psi(\theta)\rangle\}$ and a set of at least one parameter $\theta$ are determined such that as parameters $\{\theta\}$ are varied, fuzzy membership values of P are generated, given $|\phi\rangle$. Quantum mechanics dictates that any such $|\phi\rangle$ possesses a probability amplitude, $\langle\phi|\psi(\theta)\rangle$, and a corresponding quantum mechanical probability value $|\langle\phi|\psi(\theta)\rangle|^2$, relative to any other quantum state, $|\psi(\theta)\rangle$, in the Hilbert space, H, of the quantum system. The state $|\phi\rangle$ can thus be viewed as defining a distribution, $P_\phi:\{|\psi(\theta)\rangle\} \to [0,1], |\psi(\theta)\rangle \mapsto |\langle\phi|\psi(\theta)\rangle|^2$, relative to a set of such states, $\{|\psi(\theta)\rangle\}$. According to one embodiment of the present invention, each such distribution $P_\phi$ provides a representation of a corresponding fuzzy logic proposition, p, possessing a comparable distribution as its fuzzy set membership function $P(\theta)$. Furthermore, weighted sums of these distributions can be straightforwardly constructed to form further membership functions.

Figure 4:
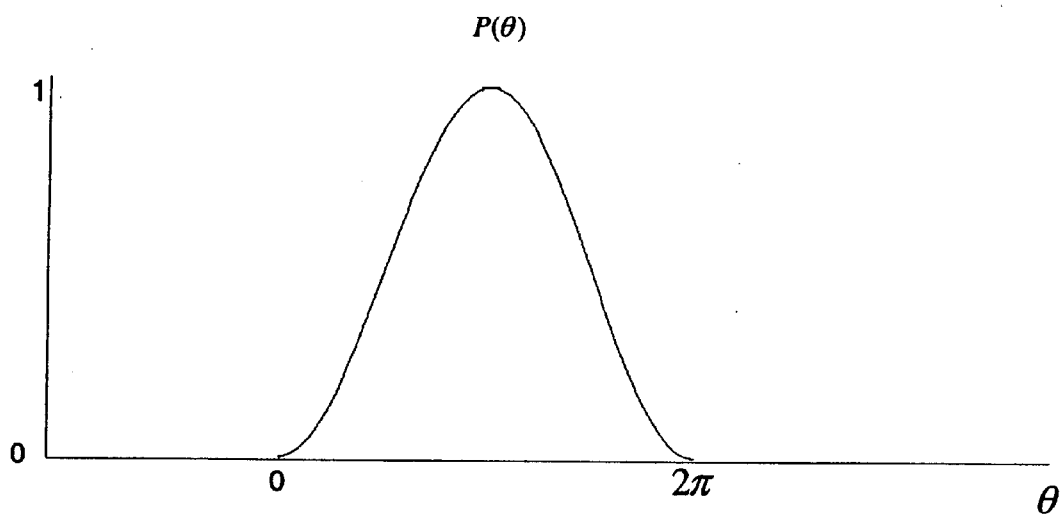
FIG. 4 shows a relationship between a reference state parameter $\theta$ for a state $|\psi(\theta)\rangle$ and an associated membership degree value ($|c|^2$) for a fuzzy set representing a fuzzy proposition p.

FIG. 4 shows a relationship between a reference parameter $\theta$ for a state $|\psi(\theta)\rangle$ and an associated membership degree value ($|c|^2$) for the fuzzy set, which is generated by forming the square of the inner product of a selected state $|\phi\rangle$ with the set of states $\{|\psi(\theta)\rangle\}$ and varying reference parameter $\theta$ (i.e., by forming $|\langle\phi|\psi(\theta)\rangle|^2$ for all values of $\theta$). The proposition p is then represented (as shown in FIG. 3) by the distribution $P_\phi$ (in this case also a function), composed of the set of quantum probability values $P_\phi(\theta) = |\langle\phi|\psi(\theta)\rangle|^2 = \sin^2(\theta/2)$, $\theta \in [0,2\pi)$.

The photon polarization thus represents a fuzzy proposition p through the distribution $P_\phi$ of values that provides its fuzzy set membership function, in the interval [0,1].

Figure 5:
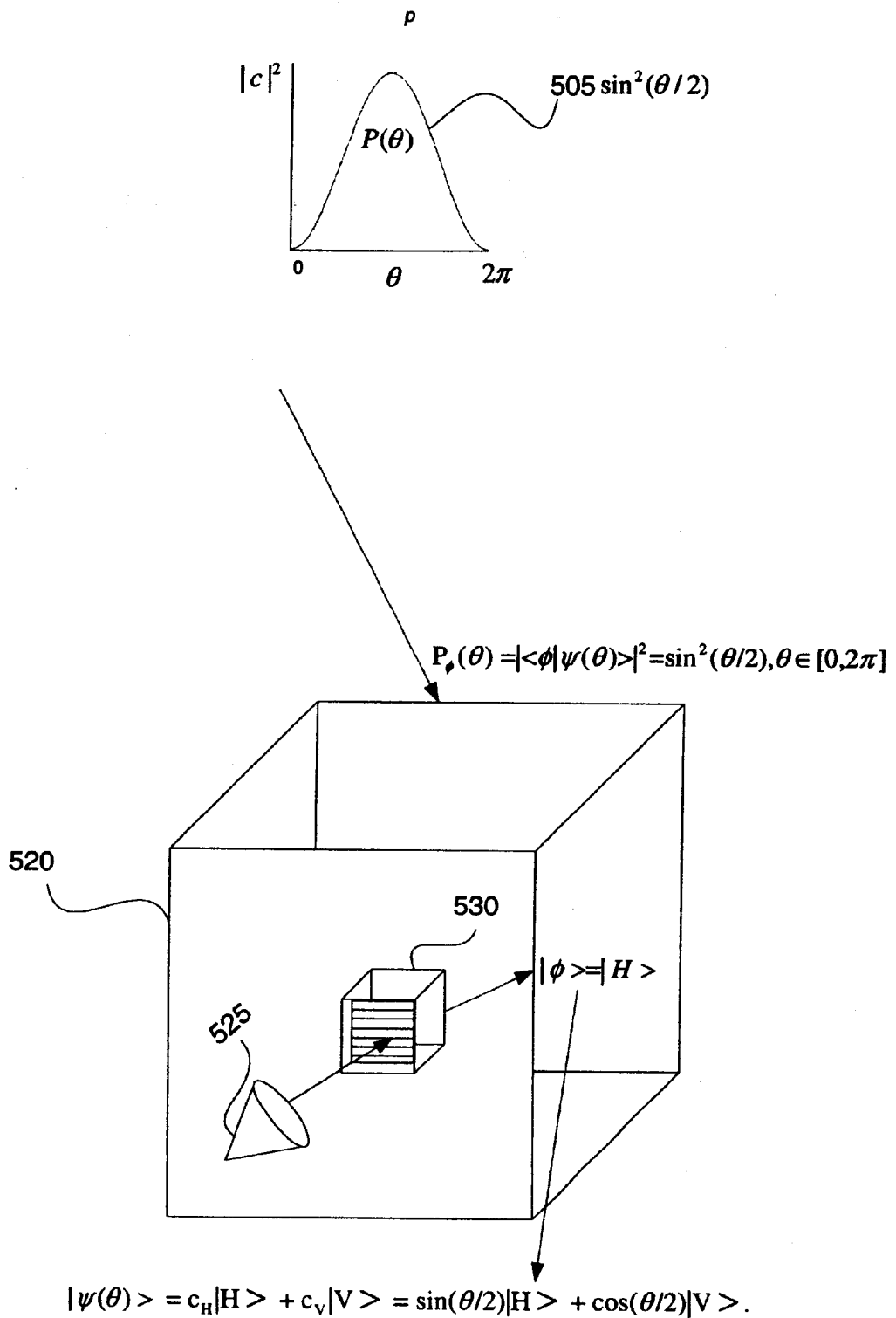
FIG. 5 depicts one example of a representation of a particular fuzzy set membership function, $P_\phi(\theta)$ according to one embodiment of the present invention.

FIG. 5 depicts one example of a representation of a particular fuzzy set membership function, $P(\theta)$, according to one embodiment of the present invention. As shown in FIG. 5, a particular fuzzy set membership function, $P(\theta)$ 505 is chosen as $$\sin^2\left(\frac{\theta}{2}\right).$$

Membership function, $P(\theta)$ 505 may be represented by the state of some physical property of a quantum system. For example, referring to FIG. 5, corresponding to step 310 in FIG. 3, a quantum state of photon polarization may be chosen in quantum system 520 in the two-dimensional Hilbert space, H, of polarization vectors. Physically, this corresponds to placing a photon generated from photon source 525 into a particular polarization state, for example, the horizontal state of linear polarization using polarizer 530, so that its polarization state is described by $|\phi\rangle = |H\rangle$. A fuzzy proposition, p, may be represented relative to a set of states of this same photon, $\{|\psi(\theta)\rangle\} \in H$, of the form $|\psi(\theta)\rangle = c_H|H\rangle + c_V|V\rangle = \sin(\theta/2)|H\rangle + \cos(\theta/2)|V\rangle$, where the membership degree value $|c|^2$ is seen to be $|c_H|^2$.

Implementing Fuzzy Logic in a Quantum System

A very large variety of distributions can be formed from quantum mechanical probability values, allowing a wide range of fuzzy propositions to be captured utilizing the representation method described herein. The fuzzy information takes the form of distributions of quantum mechanical values (traditionally interpreted as probability values) that occupy the full range [0,1], rather than being represented in quantum superpositions of binary eigenstates (that is, "qubits"), as in prior, "crisp" forms of quantum information processing.

Fuzzy logic operations involving these propositions can then be carried out via various quantum mechanical processes, including measurements. The present invention is compatible with the implementation of monadic, dyadic and/or n-adic logic operations.

Figure 6:
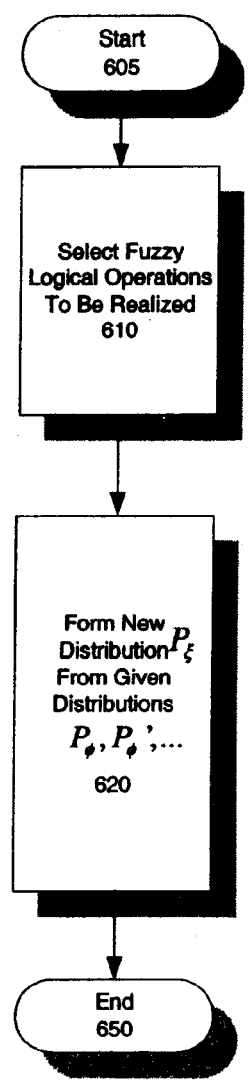
FIG. 6 is a flowchart that depicts a method for implementing quantum fuzzy logic according to one embodiment of the present invention.

FIG. 6 is a flowchart that depicts a method for implementing quantum fuzzy logic according to one embodiment of the present invention. The process is initiated in step 605. In step 610, fuzzy-logical operations (e.g., not, and, or, etc.) to be realized are selected. In step 620, a new distribution $P_\xi$ is formed from given distributions in accordance with the particular form of fuzzy logic chosen, corresponding, in general, to a quantum density operator ρ formed from input distributions; the membership function values are obtained from the quantum mechanical formula Tr(ρO(θ)), where O(θ) plays the role of |φ(θ)> in the previous section, for example.

For example, the monadic operation of negation (¬) may be effected by interchanging the quantum states |H> and |V>. In particular, by performing the quantum mechanical unitary operation that interchanges the states |H> and |V> with respect to the set of states {|ψ(θ)>}, the negation ¬p of the proposition p may be formed. That is, when <φ|=<H|, then <ξ|=>V| and the projection probabilities <ξ|ψ(θ)> represent the distribution of the fuzzy set membership function associated with ¬p. Thus, assuming the physical state of polarization of a photon were utilized to represent fuzzy information, the operation of negation could be performed on a photon by passing it through a polarization flipper as described below.

According to one embodiment of the present invention, the following quantum operators correspond to some basic logic operations that can be carried out on fuzzy propositions:

| Proposition | QuantumOperator |
|---|---|
| ¬p | 1 − ρ |
| p ∧ p' | PP' |
| p ∨ p' | P + P' − PP' |
| p ⌢ p' | ρρ' |
| p ⌣ p' | ρ + ρ' − ρρ' | where P and P' are Hilbert space projection operators (the simplest type of density operators), and ρ and ρ' (possible mixed) density operators. Density operators are simply weighted sums of the projection operators corresponding to quantum state vectors (see, for example, Dirac, Sect. 33). A density operator ρ is written in terms of state vectors |α$^{(i)}$> and projectors P$_i$:

$$\rho = \sum_i w_i |\alpha^{(i)}\rangle \times \langle \alpha^{(i)}| = \sum_i w_i P_i,$$

where the w$_i$ are statistical weights.

According to alternative embodiments of the invention, other versions of these or other fuzzy logical connectives may be defined in terms of density operators in a similar manner. For example, connectives can be chosen from those previously used for two- and three-value logics traditionally associated with the quantum Hilbert space (see, for example, Varadarajan, Ch. 4). The above set of operations allows the possibility of utilizing both quantum statistical and single-system quantum contributions to the quantum mechanical probability values representing fuzzy information, in which case the density operator representation, not merely one using projectors, would be required. The particular quantum states, |φ>, |φ'>, |ψ>, |ψ'>, and the operators P, P', ρ and ρ' can be chosen to suit the precise mathematical form of fuzzy logic desired. The domains of these operators will similarly depend on the particular sort of fuzzy logic desired.

Figure 7:
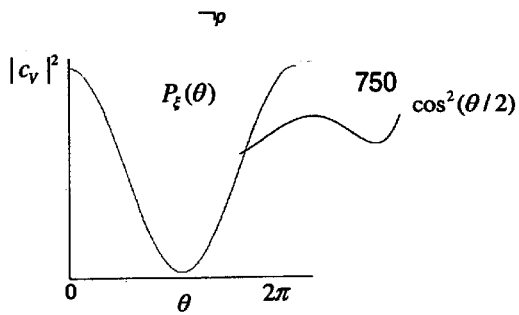
FIG. 7 depicts one example for forming the negation ¬p of a fuzzy proposition p according to one embodiment of the present invention.
Figure 7:
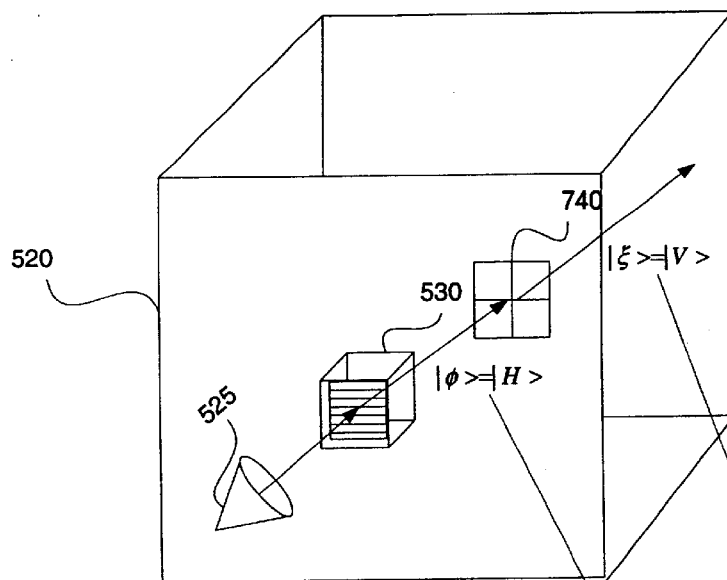
Figure 7:
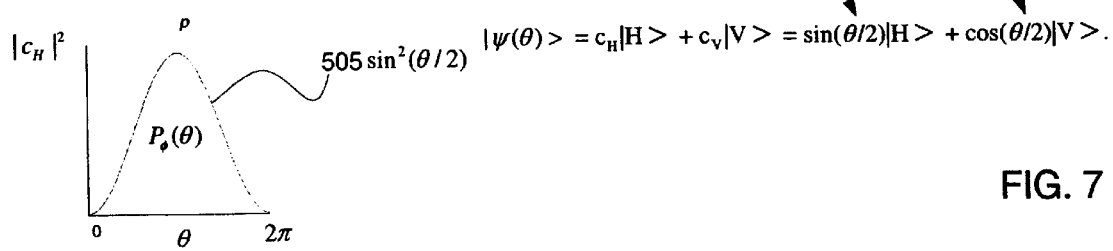

FIG. 7 depicts one example for forming the negation of a fuzzy proposition according to one embodiment of the present invention. The negation, ¬p, of the fuzzy proposition p above, can be constructed as follows. A photon from photon source 530 is initially placed in the quantum state |φ>=|H> via polarizer 530. The quantum state |φ>=|H> is replaced by the quantum state |ξ>=|V> via polarization flipper 740, while the set of states {|ψ>} remains the same, yielding the function P$_ξ$(θ)=|<ξ|ψ(θ)>|$^2$=cos$^2$(θ/2), θ∈[0,2π), which represents the proposition ¬p. The result corresponds to the projection operator P'=1−|H><H|=|V><V| and P$_ξ$(θ)=Tr(P'O(θ)), where O(θ)=|ψ(θ)><ψ(θ)|.

Similarly, the dyadic logical operation of conjunction of two propositions, of two propositions r and s (r^s) represented by two states |α> and |β> and the state set {|ψ(θ)>}, can sometimes be represented by the state |α>|β> by suitably choosing the quantum variable(s) of which they are eigenstates suitably renormalized, together with {|ψ(θ)>}. For example, they could be linear polarization eigenstates of two photons, as in the above examples, with the corresponding projection operator P'=RS=|α><|β><β|, and P$_ξ$(θ)=Tr([RS][O(θ)O'(θ')]).

Implementing Fuzzy Control In A Quantum System

Figure 8:
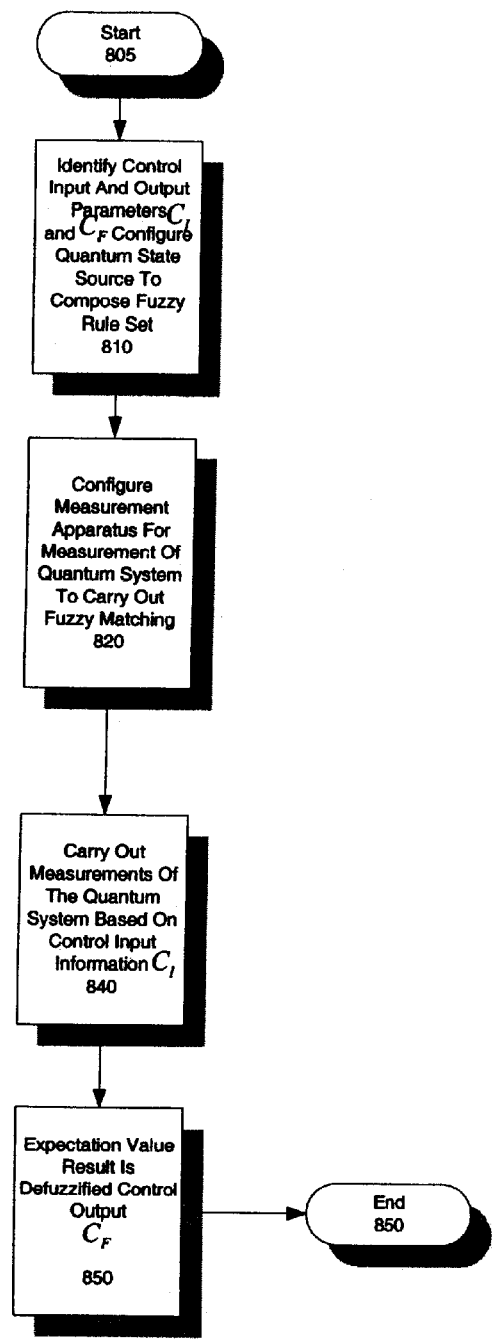
FIG. 8 is a flowchart that depicts a series of steps for implementing fuzzy control according to one embodiment of the present invention.

Using the method described above, fuzzy control operations may be implemented. FIG. 8 is a flowchart the depicts a series of steps for implementing fuzzy control according to one embodiment of the present invention. First, these fuzzy proposition pairs are represented via quantum states as described herein, each pair associated a first quantum state for the first proposition, p, and a second quantum state for the second proposition, p' of each control rule.

Figure 9:
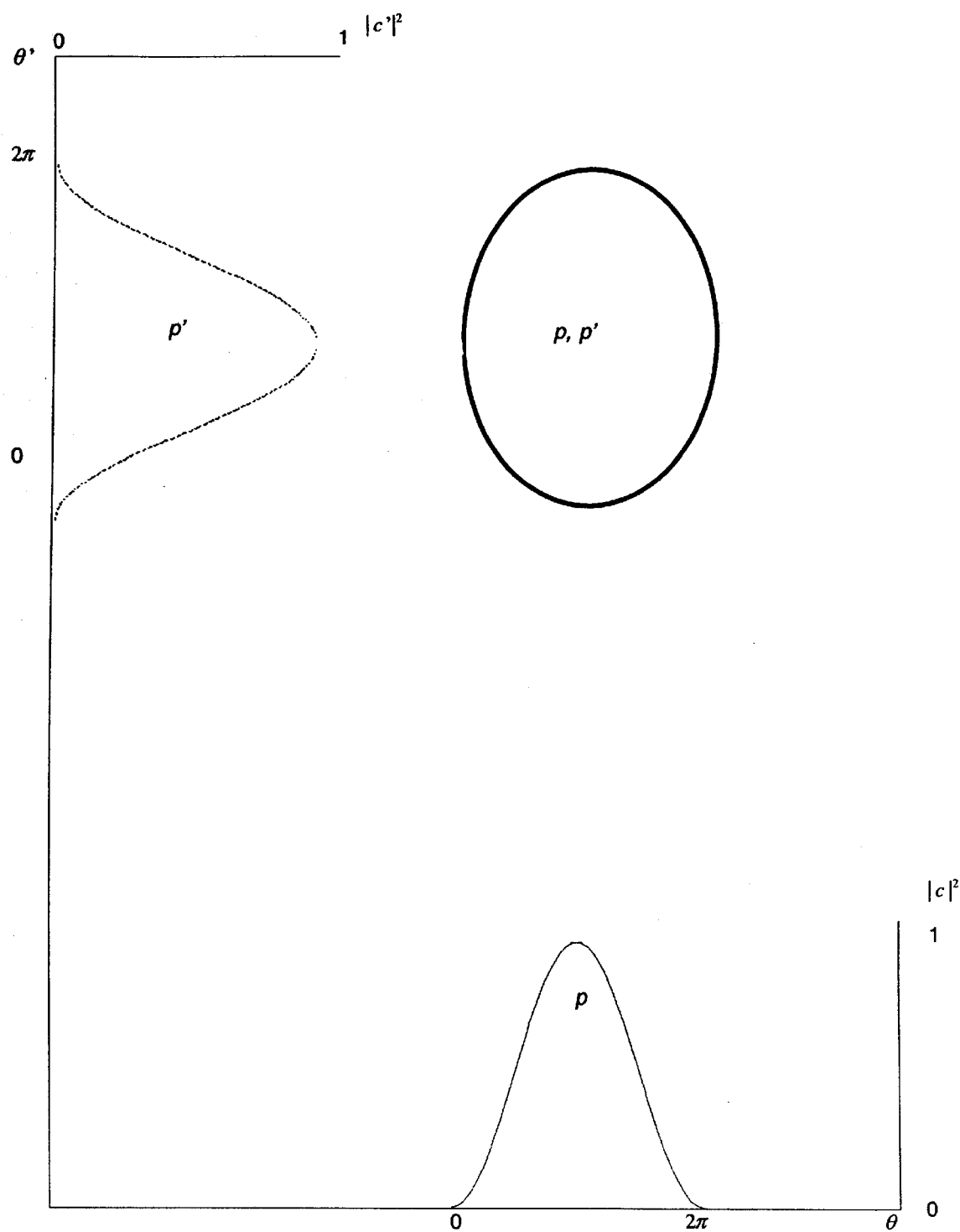
FIG. 9 illustrates a fuzzy control rule pair according to one embodiment of the present invention.

FIG. 9 illustrates a fuzzy control rule pair according to one embodiment of the present invention. To implement fuzzy control of some object, one crisp input datum, C$_I$, characterizing one of its properties (for example, the object's speed) is taken as the "crisp" input. Although according to the embodiment described herein, a single crisp input and output is assumed, the present invention is compatible with any number of inputs and outputs as required by a particular control task. Thus, in alternative embodiments multiple inputs and outputs may be used.

This crisp input is then "fuzzified," by relating it to each initial fuzzy proposition, p$_i$, of each of the logic patches, (p$_i$,p'$_i$), of the given control rule set {(p$_i$,p$_i$')}. As described above, the control rule set is represented by an initial quantum state selected to be emitted by a quantum state source. According to one embodiment, this may be accomplished using two polarized photons, for example, a nonlinear optical crystal (such as Beta Barium Borate) pumped by laser light.

Figure 10:
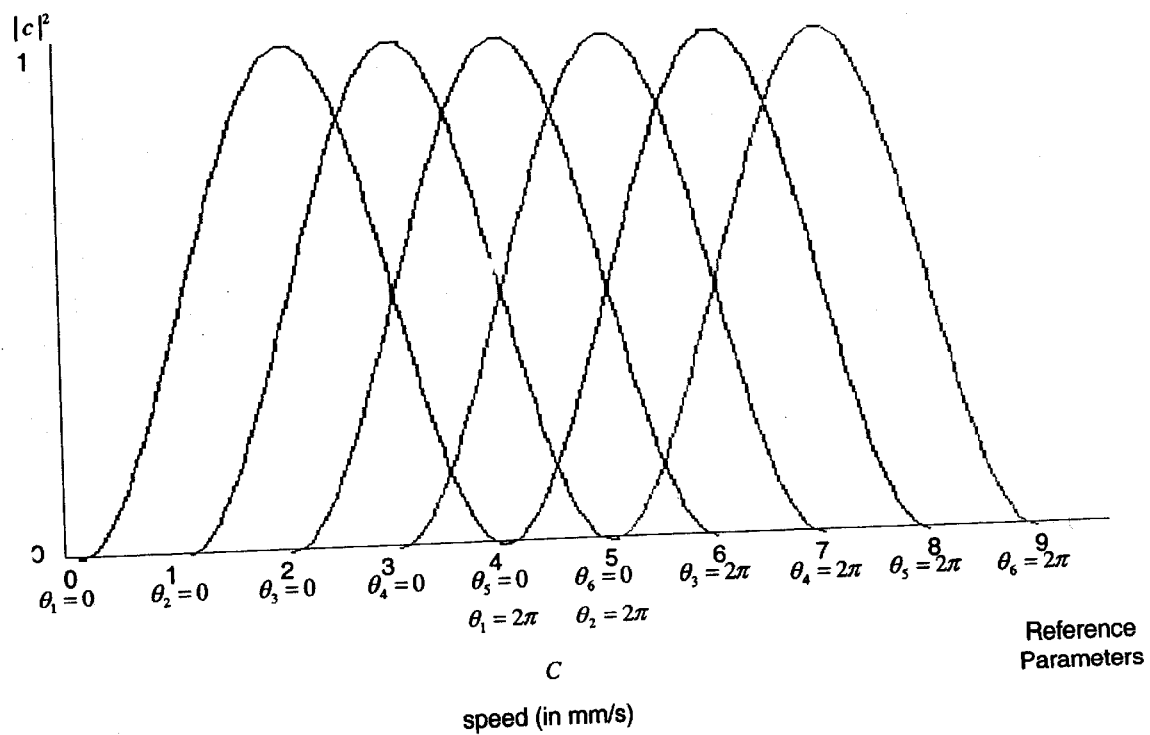
FIG. 10 illustrates the fuzzification of a crisp input $C_1$ with respect to a number of logic propositions according to one embodiment of the present invention.

For example, FIG. 10 illustrates the fuzzification of a crisp input with respect to a number of logic propositions according to one embodiment of the present invention. According to one embodiment, this relation is provided by some function (often as simple as a constant scaling factor, N$_i$, for example, a voltage to an optical polarizer) connecting the conditioning property to the set of quantum eigenstates {ψ(θ)}, associated with p$_i$ via |φ$_i$>.

By virtue of the pairing of propositions p$_i$ and p$_i$' in these rules governing control, the membership degree for the final proposition, p$_i$', of each rule is also determined by the input datum and the control rules. Quantum mechanically, this is determined through the correlations inherent in the chosen quantum states originating from the state source. Joint quantum measurements are then made of those states to which the rules non-trivially apply, where the states |φ$_i$>,|φ$_i$'> to be measured are determined by the input datum. The crisp input datum also determines precisely how each part of this joint measurement is to be made, for example, via a quantum state selector such as a polarizer. Jointly measuring the quantum states |φ$_i$> and |φ'$_i$> relative to the appropriate elements $|\psi_i(\theta_i)\rangle$ and $|\psi'_i(\theta'_i)\rangle$ (elements of the sets $\{|\psi(\theta)\rangle\}$ and $\{|\psi'(\theta')\rangle\}$). These measurements are described by quantum operators $O(\theta)$ and $O'(\theta')$, implementing the fuzzy control rule by evaluating the fuzzy propositions $p_i$ and $p_i'$ over the relevant range of values of parameters $\theta$ and $\theta'$.

For example, according to one exemplary embodiment, the quantum states are chosen as states of photon polarization (of, for example, a photon pair): horizontal linear polarization $|\phi\rangle = |H\rangle$ for p, and $|\phi'\rangle = |H\rangle$ for p'. As with the proposition p and distribution $P_\phi(\theta)$ described above, the second fuzzy proposition p' is then represented by the distribution defined by $|\phi'\rangle$ relative to a set of states $|\psi'(\theta')\rangle \ge c_H'|H\rangle + c_V'|V\rangle$, $c_H'$ and $c_V'$ being complex numbers such that $|c_H'|^2 + |c_V'|^2 = 1$. That is, $$P_{\phi'}(\theta') = \langle\phi'|\psi'(\theta')\rangle|^2 = \sin^2(\theta'/2),\ \theta' \in [0, 2\pi)$$

These functions, $P(\theta)$ and $P'(\theta')$, provide a quantum representation of a control rule pair involving two propositions p and p'.

In this case, the (joint) quantum measurement, OO', is made of $|H\rangle|H\rangle$, $O(\theta) = |\psi(\theta)\rangle\langle\psi(\theta)|$ and $O(\theta) = |\psi'(\theta')\rangle\langle\psi'(\theta')|$.

where the probability of a positive measurement result is $|\langle\phi|\psi(\theta)\rangle|^2|\langle\phi'|\psi'(\theta')\rangle|^2$. For this rule, the input datum determines the values of the angles $\theta$ and $\theta'$ for the quantum projectors implemented via a quantum state selector (here two polarization analyzers describing the corresponding quantum measurements).

The "defuzzification" step of fuzzy control is also automatically carried out by making an identical series of these measurements on an identically prepared ensemble of states from a quantum source, in that the output obeys quantum mechanical laws that are inherently statistical, taking the form of expectation values derived by measurements after the state analyzer. The resulting crisp control output is a simple function of these measurement results. This output, $C_F$, can, for example, take the form of accumulating the weighted ensemble average over a combination of the single and joint quantum measurement values. This crisp output, for example, a voltage, specifies the action (for example, the positive or negative acceleration) applied to the object under control.

Figure 11:
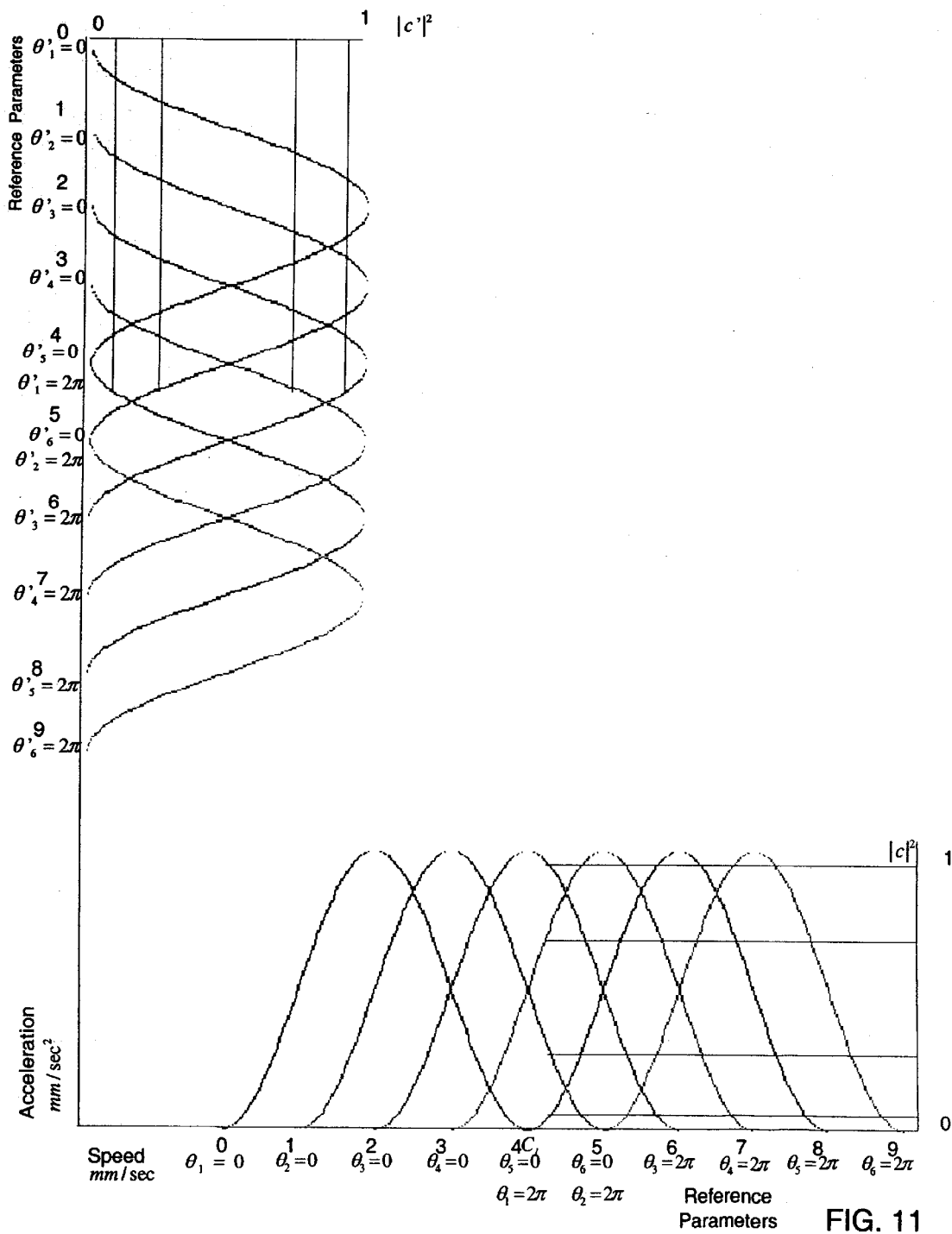
FIG. 11 illustrates a fuzzy inference involving a set of fuzzy control values according to one embodiment of the present invention.

For example, according to one exemplary embodiment, fuzzy control is applied to a speed of an object. According to this example, the controlled object has a speed of 4.2 mm/s and the ranges of the first portions of the control rules (fuzzy membership sets) are 4 mm/s in extent starting at each whole number (of mm/s), i.e. 1 mm/s, 2 mm/s, 3 mm/s, etc (see FIG. 11). In this example, the fuzzy control rules with first portions beginning their ranges at 1 mm/s, 2 mm/s, 3 mm/s and 4 mm/s would all nontrivially apply. The effect of applying this rule set on quantum systems is to weight the possibility distribution of the each second (consequence) proposition by the quantum probability value $|\langle\phi_i|\psi_i(\theta)\rangle|^2$ of its premise, as specified by the distribution $P_\phi$, for the relevant value, $\theta$. Joint measurements of the observable pairs $P_i$ and $P_i'$ as above will then yield a positive result with probability $|\langle\phi|\psi(\theta)\rangle|^2|\langle\phi'|\psi'(\theta')\rangle|^2$.

Defuzzifying, reading off the average of a set of such measurements, will yield a crisp output datum progressively closer to a crisp output datum that is given by quantum mechanical law the more measurements are made. The exact average chosen will depend on the particular form of fuzzy control desired and the number of measurements made is given by the computational efficiency desired. For example, in a very simple case it might be desirable to use a variant of the centroidal defuzzification method obtaining, for a statistically significant number of measurements, the crisp output $$C_F = \frac{\sum_{i=1}^n |\langle\phi_i|\psi_i(\theta)\rangle|^2 \{N_i'|\langle\phi_i'|\psi_i'(\theta')\rangle|^2 + y_i\}}{\sum_{i=1}^n |\langle\phi_i|\psi_i(\theta)\rangle|^2},$$

where n is the number of rules in force, the $N_i'$ is the extent of the control variable interval of the fuzzy proposition $p_i$, and $y_i$ is the initial point of this interval for each value of index i. To make the process more efficient fewer measurements need be made.

The present invention may be applied to implement multiple control rules simultaneously; fuzzy control systems typically invoke several control rules simultaneously. As in the examples described above, pairs of quantum states can be used to represent pairs of fuzzy propositions. n pairs of quantum states are needed to implement n rules. It is a useful shorthand notation to re-label the $|\phi\rangle$ of each pair as $|p\rangle$ and each $|\phi'\rangle$ as $|p'\rangle$. In order to implement fuzzy control, the following the following notation to describe a quantum state could be used to encode two such rules:

$$|\Phi\rangle = |p_1\rangle|p_1'\rangle|p_2\rangle|p_2'\rangle.$$

Using such a representation, each quantum measurement operator will act in a different subspace of the total Hilbert space. That is, the vectors $\{|\psi(\theta)\rangle\}$ and $\{|\psi'(\theta')\rangle\}$ will lie in different spaces. Then joint measurements will be made on pairs $|p_1\rangle|p_1'\rangle$ for the pertinent values of i, depending on the crisp input datum $C_I$.

According to an alternative embodiment, the phenomenon of quantum entanglement within the quantum states that encode fuzzy propositions may be utilized in implementing fuzzy control. Rather than simply forming quantum product states from the representative states, $|p_1\rangle = |\phi_i\rangle$ and $|p_i'\rangle = |\phi_i'\rangle$ in the context of $\{|\psi(\theta)\rangle\}$, and $\{|\psi'(\theta')\rangle\}_i$, it is possible to use sets of $|p_i\rangle = |\phi_i\rangle$ and $|p_i'\rangle = |\phi_i'\rangle$ lying in the same subspaces of the Hilbert space. This allows the complete exploitation of the quantum characteristics for control through the use of an entangled quantum state $|\Phi'\rangle$. An example of a quantum superposition for implementing two such rules is $$|\Phi'\rangle = \frac{1}{\sqrt{2}}(\alpha|p_1\rangle|p_1'\rangle + \beta|p_2\rangle|p_2'\rangle),$$

where $|\Phi'\rangle$ is an entangled state, that is, one not factorable into two vectors $|\phi\rangle|\phi'\rangle$, one vector in each of the two subspaces of the first and second subsystems (e.g. photon 1 and photon 2 of a two-photon pair). In this case, the evaluation of the fuzzy rules will be given by a joint measurement for which the probability for a positive result will have a more complicated form, not necessarily factoring into a product of projection probability values for $p_i$, and $p_i'$ alone. Such an implementation has the benefit of reducing the number of quantum systems needed to implement control, as well as harnessing the speed-up available in quantum computation. The result of the defuzzification step will yield a result somewhat different in form from the $C_F$ above, because of differences in the probabilities of joint quantum measurement results that can include quantum interference terms. For example, another variant of the centroidal method of defuzzification scheme is $$C_F = \frac{\sum_{i=1}^{n} \{N_i' P(\phi_i, \phi_i'|\theta_i, \theta_i') + y_i P(\phi_i|\theta_i)\}}{\sum_{i=1}^{n} P(\phi_i|\theta_i)},$$

where $P(\phi_i,\phi_i'|\theta_i,\theta_i')$ and $P(\phi_i|\theta_i)$ are the probabilities of positive joint and single-measurement results, respectively. The quantum operations corresponding to the various actions on fuzzy propositions may act within the same subspace of the system Hilbert space, so that quantum interference could play a role in implementing fuzzy control.

This latter manner of using quantum states to implement fuzzy control thus allows the exploitation of the vectorial nature of quantum states in carrying out parallel fuzzy quantum information processing (fuzzy quantum computing) by utilizing a quantum superposition of state-pairings, each associated with a control rule.

Figure 12:
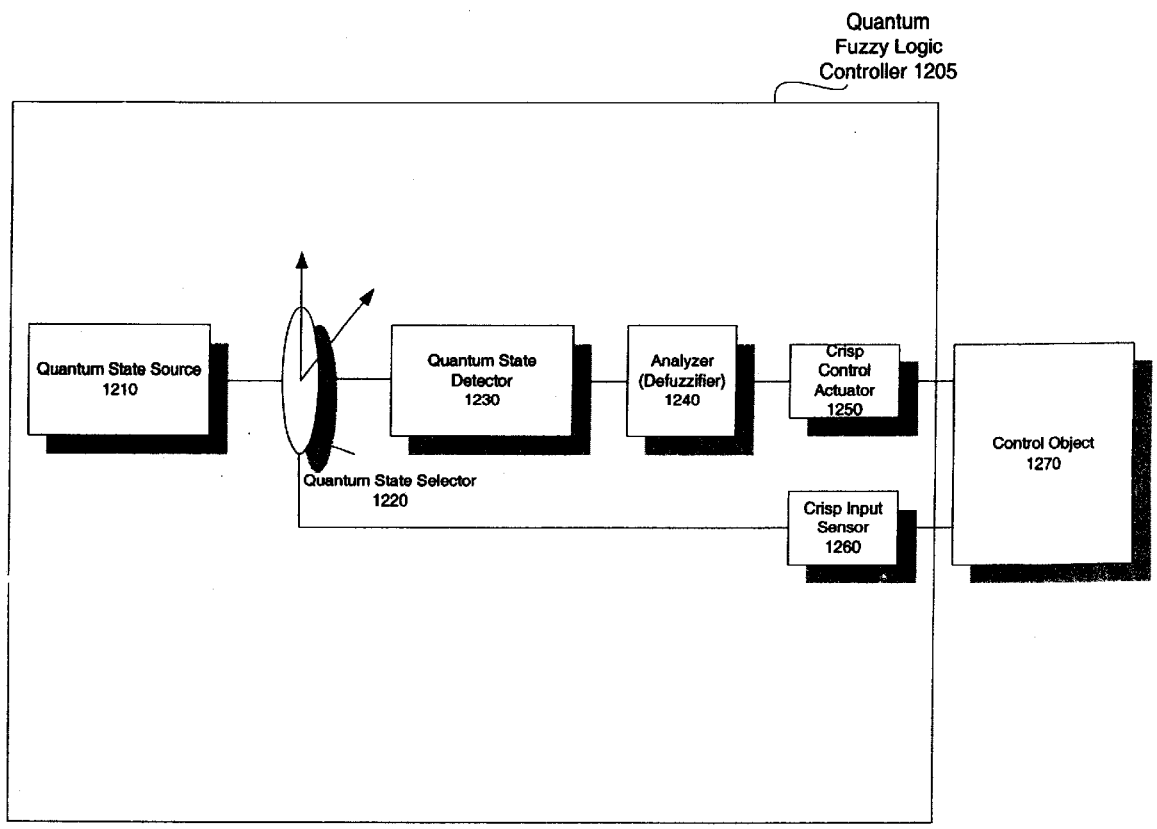
FIG. 12 is a block diagram that illustrates a quantum fuzzy logic controller in relationship to a control object according to one embodiment of the present invention.

FIG. 12 is a block diagram that illustrates a quantum fuzzy logic controller in relationship to a control object according to one embodiment of the present invention. Quantum fuzzy logic controller 1205 includes quantum state source 1210, quantum state selector 1220, quantum state detector 1230, analyzer (defuzzifier) 1240, crisp control actuator 1250 and crisp input sensor 1260. Quantum fuzzy logic control system 1205 performs control on control object 1270.

Crisp input sensor 1260 senses physical information related to control object (e.g., speed) and provides output to quantum state selector 1220. Crisp input sensor 1260 effectively determines values of the angles θ and θ', which are used for the quantum projectors implemented via quantum state selector 1220. Quantum state selector 1220 selects a quantum state from quantum state source 1210. In the case of a control rule pair, quantum state selector 1220 would select states $|\psi(\theta)\rangle$ and $|\psi'(\theta')\rangle$ corresponding respectively to input and output. As described above, quantum state selector may be, for example, a polarizer or pair of polarizers wherein the quantum states are chosen as states of photon polarization (of, for example, a photon pair): horizontal linear polarization $|\phi\rangle = |H\rangle$ for p, and $|\phi'\rangle = |H\rangle$ for p'.

Quantum state detector 1230 is used to perform an ensemble of measurements of the quantum state, wherein as described above joint measurements of the observable pairs $P_i$ and $P_i'$ as above will then yield a positive result with probability $|\langle\phi|\psi(\theta)\rangle|^2 |\langle\phi'|\psi'(\theta')\rangle|^2$.

Analyzer (defuzzifier) 1240 generates an average value (i.e., crisp output $C_F$) of the ensemble of measurements generated by quantum state selector 1230 using a particular average value function. Crisp output $C_F$ is then passed to crisp control actuator 1250 (e.g., in the physical form of a voltage), which is utilized by crisp control actuator 1250 to perform control on control object 1270.

What is claimed is:

1. A method for representing at least one fuzzy set in a quantum system, comprising the steps of:
   (a) placing at least one quantum system into at least one quantum state, wherein the quantum state has associated projection probabilities relative to all other quantum states in a same Hilbert space or subspace;
   (b) forming a distribution from the projection probabilities of the at least one quantum state relative to a set composed of at least one quantum state in the same Hilbert space or subspace; and,
   (c) associating the distribution with the at least one fuzzy proposition through identification as the fuzzy membership function for that proposition.

2. A method for carrying out fuzzy logic operations in a quantum computing device, comprising the steps of:
   (a) placing at least one quantum system into at least one first quantum state, wherein the quantum state has associated projection probabilities relative to all other quantum states in a same Hilbert space or subspace; and
   (b) forming a distribution from the projection probabilities of the at least one quantum state relative to a set composed of at least one quantum state in the same Hilbert space or subspace;
   (c) selecting at least one fuzzy logic operation; and,
   (d) forming a new distribution by replacing the at least one first quantum state by a second quantum state in accordance with the fuzzy logic operation.

3. The method according to claim 2, wherein the new distribution is formed from projection probability values of the second quantum state relative to a set of at least one quantum state in a Hilbert space.

4. The method according to claim 2, wherein the fuzzy logic operation is associated with a fuzzy set membership function relating to a result of a fuzzy monadic logic operation.

5. The method according to claim 2, wherein the fuzzy logic operation is associated with a fuzzy set membership function relating to a result of fuzzy n-adic logical operation.

6. A method for performing fuzzy control, comprising the steps of:
   (a) representing at least one control rule in at least one quantum system, wherein the control rule includes at least one distribution associated with quantum state projection probability values;
   (b) performing joint quantum measurements of the at least one quantum system in at least one quantum state as a function of a control input; and,
   (c) determining a control output.

7. The method according to claim 6, wherein step (a) further includes the step of placing the at least one quantum system into at least one quantum state, wherein the quantum state has associated projection probabilities relative to all other quantum states in a same Hilbert space or subspace.

8. The method according to claim 6, wherein step (b) further includes the step of identifying at least one fuzzy control rule to be implemented based upon the control input.

9. The method according to claim 6, wherein the control output of step (c) is determined upon performing the joint quantum measurements yielding a result corresponding to an expectation value for a quantum mechanical operator representing a defuzzification step.

10. The method of claim 9, wherein the control output is of a form of a weighted ensemble average of quantum measurement values.

11. A system for performing fuzzy control comprising:
    (a) an input sensor, wherein the input sensor detects at least one input parameter;
    (b) a quantum state source for generating a quantum state;
    (c) a quantum state selector, wherein the quantum state selector is coupled to the input sensor and selects a quantum state as a function of the input parameter;
    (d) a quantum state detector for generating an ensemble of measurement values, wherein the quantum state detector is coupled to the quantum state selector;

(e) a defuzzifier, wherein the defuzzifier generates a control output as a function of the ensemble of measurement values using a pre-defined function; and, (f) a control device, wherein the control device performs a control operation as a function of the control output.

12. The system according to claim 11, wherein the control device includes at least one actuator.

13. The system according to claim 11, wherein the quantum state selector includes at least one polarizer.

14. The system according to claim 11, wherein the input sensor detects at least one input parameter related to a control object.

* * * * *